Dec. 6, 1960 M. MACCAFERRI 2,962,759
HEATING CYLINDERS FOR INJECTION MOLDING MACHINES
Filed Feb. 18, 1955 3 Sheets-Sheet 3
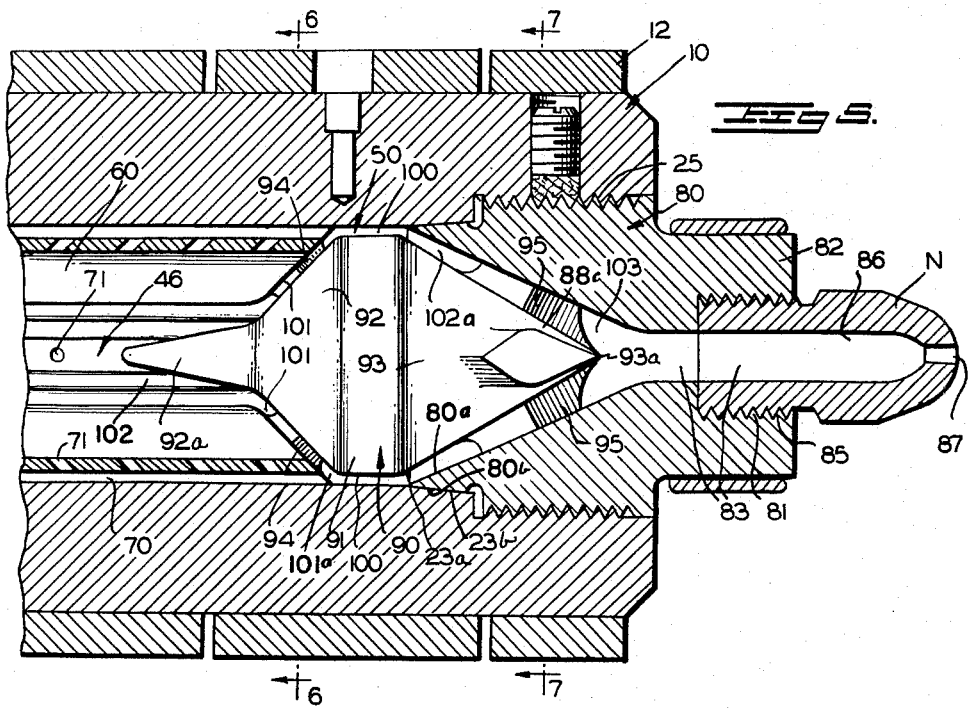
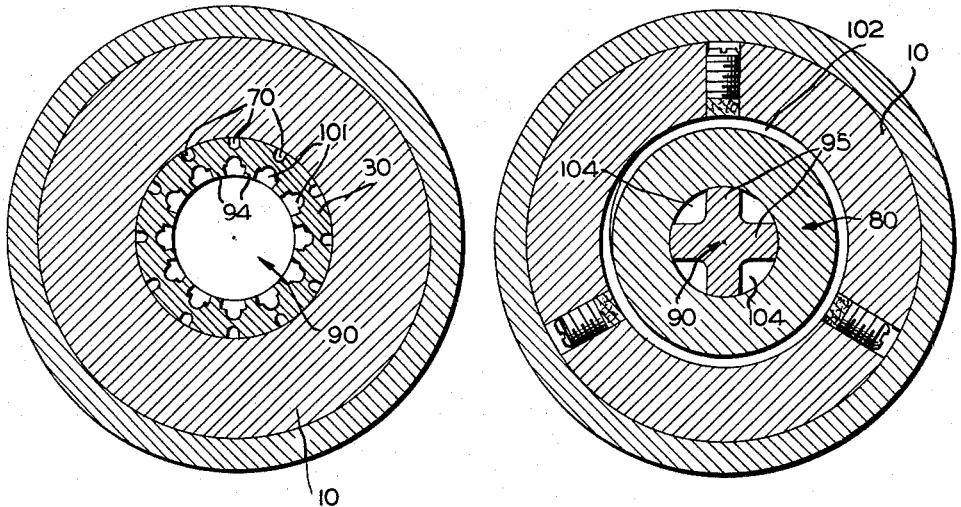
INVENTOR:
Mario Maccaferri
BY Peck & Peck
ATTORNEYS 2,962,759
Patented Dec. 6, 1960

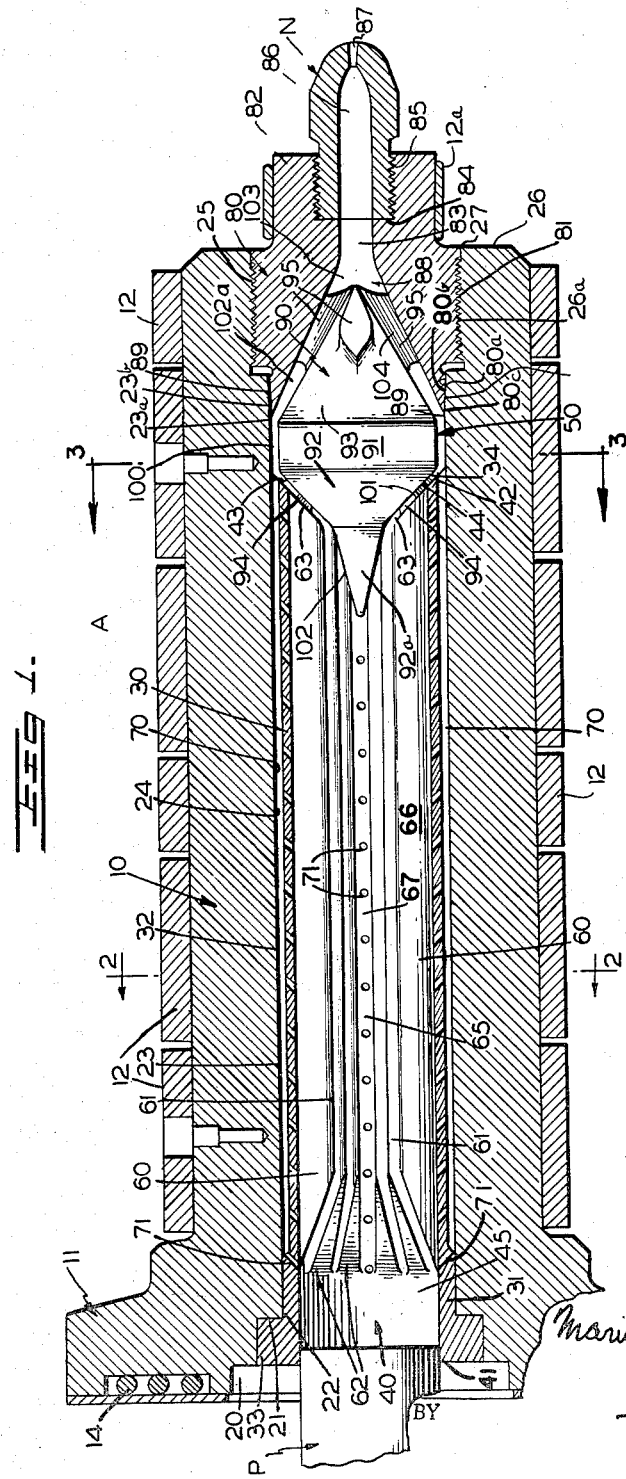

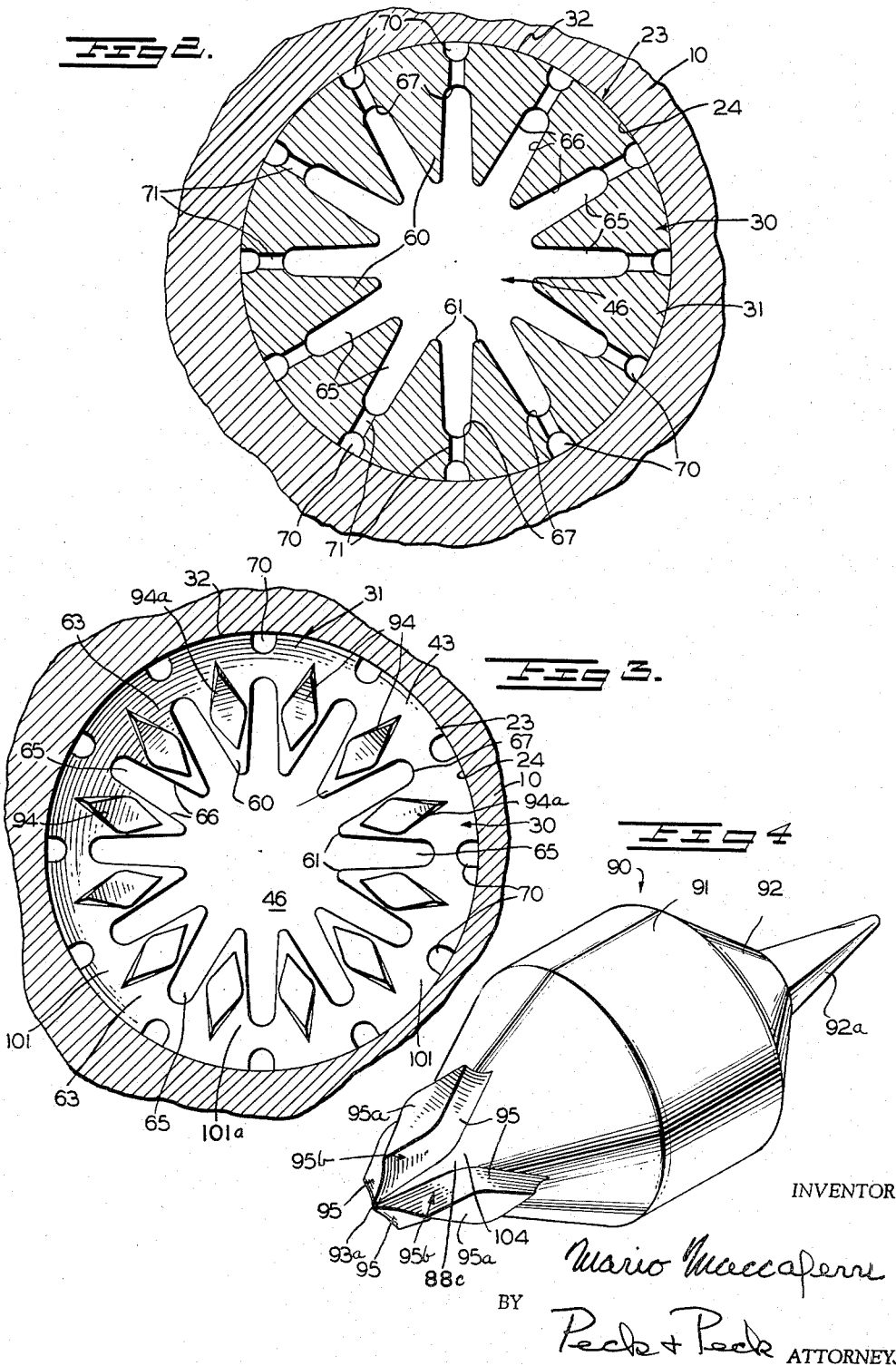

2,962,759

HEATING CYLINDERS FOR INJECTION MOLDING MACHINES

Mario Maccaferri, Rye, N.Y.

Filed Feb. 18, 1955, Ser. No. 489,080

10 Claims. (Cl. 18—30)

This invention relates to certain improvements in heating cylinders for injection molding machines; and the nature and objects of the invention will be readily recognized and understood by those skilled in the art in the light of the following explanation and detailed description of the accompanying drawings illustrating what I at present believe to be a preferred embodiment or mechanical expression of my invention from among various other forms, embodiments, combinations, constructions and expressions of which the invention is capable within the broad spirit and scope thereof, as defined by the claims hereto appended.

Injection molding with thermoplastic materials is generally carried out by forming a measured charge of the thermoplastic in a dry solid state, usually in granular form, and then by the controlled application of heat thereto in a melting chamber or cylinder, plasticizing a charge thereof and injecting the plasticized charge under pressure from the chamber or cylinder into a mold. In practice, the injection molding cycle is carried out in a very limited over-all period of time. Dependent upon the size of the charge of plastic material and the size and characteristics of the articles to be molded therefrom, as well as the type and character of the plastic material itself, the period of time allotted by an injection molding cycle for heating or plasticizing a charge may be only a matter of seconds. Thus it becomes necessary to uniformly plasticize each charge into the required condition for efficient injection usually in a matter of a relatively few seconds. As the characteristics physically of the article injection molded from any particular thermoplastic material, is dependent upon the proper plasticizing of the charge prior to its injection into the mold, the plasticizing or heating step presents one of the serious problems in the art of injection molding of plastics.

One of the major factors contributing to this problem is the fact that the various thermoplastic materials adapted for injection molding, such, for example, as the acrylic, vinyl and styrene plastics, from among others, are very poor conductors of heat. As the mass of plastic material forming a charge to be plasticized must be confined and controlled and directed in its movements under pressure from its point of formation to the point at which it is to be injected as a plasticized charge, the plasticizing is carried out by conducting heat to and around the external portions of the mass. Due to the non-conducting characteristics of the plastic material forming the charge, it is extremely difficult to heat to the degree necessary the major central portion of the mass in the limited period of time allowable for such heating without overheating and burning the external portions. These plastics generally can be harmfully burned or overheated. If sufficient heat is applied to a charge to reach the inner or central portions of the mass of plastic, it is frequently found that injurious burning or overheating of the outer or external portions thereof will result so that the physical characteristics of an article molded therefrom will be unsatisfactory. And such thermoplastics, when burned, generate gases in the mass which add to the problem of pressure forcing the mass through its confining passages.

Aside from being very poor conductors of heat and being subject to injury from burning or overheating, these thermoplastic materials, especially in the dry, solid granular form generally used for injection molding, have high abrasive characteristics. When a charge or mass of such a plastic material, particularly if in granular form and cold, is confined as a column in a passage through which it is to be forced, the columnar mass inherently has a degree of elasticity which is seriously augmented in the entire confined mass, including the plasticizing and plasticized portions thereof, by gases generated from burning or overheating any portion of the mass. Elasticity of the columnar mass causes the mass to tend to "block" in its confining passage or passages, so that increasing pressures are required to force the mass therethrough. These characteristics and the undesirable conditions resulting therefrom are increased with an increase in the cross-sectional dimensions of such a columnar mass and the resulting increase in pressures required to displace the mass.

In the commercial practice generally followed to injection mold thermoplastic materials, the measured charge of dry and usually granular solid plastic is plasticized or brought to the required fluent condition by the controlled application of heat thereto in a so-called plasticizing or heating cylinder structure into and through which the charge of plastic is forced by the application of relatively high pressures thereto at the intake end of the cylinder with the heat being applied by conduction through heat conducting structure of the cylinder to the portions of the plastic material in direct contact with such heat conducting surfaces. Such a plasticizing or heating cylinder is usually typified by a major or primary passage extending axially therethrough from the intake end of the cylinder to the opposite discharge or mold injection end thereof where the material in fluent, plasticized condition is forced therefrom through a suitable nozzle or discharge orifice for injection into a mold. The heating cylinder so characterized usually forms a component of an injection molding machine which includes a pressure fluid driven reciprocating injection piston or plunger which, on its charging stroke, forces the measured charge of the dry solid plastic into the heating cylinder and through the passage arrangement thereof to and through the plasticized material injection outlet.

In the operation of such an injection molding machine, upon completion of the charging stroke the plunger withdraws to position for receiving the next measured charge of plastic for forcing into the heating cylinder against the plastic charge then filling and being plasticized in the cylinder to thereby displace from the discharge end of the cylinder a charge of plasticized material for injection into a mold. Thus the operation is an intermittent one with the plastic material being forced through and from the heating cylinder during the charging stroke and remaining at rest in the cylinder during the return stroke of the plunger to charging position. The heating cylinder passages remain filled with the mass of plastic material throughout the operations, with cold, solid material charges intermittently forcing such mass therethrough and discharging portions thereof therefrom and thus replacing the displaced material of the mass. During the interval of time provided for by the cycle between the completion of the charging stroke of the injection plunger and the start of the next charging stroke, the mass of plastic in the heating cylinder remains at rest and is being plasticized by the heat applied thereto to bring the charge to be forced from the discharge end of the cylinder to condition for injection therefrom by the pressures applied to the mass by the forcing of the next charge of plastic into the heating cylinder. On the next charging stroke of the plunger the replacement charge of cold, dry plastic material is forced against the end of the mass or column of material at the intake end of the heating cylinder and the plasticized charge to be injected into the mold is thus forced under pressure from the heating cylinder. Hence, the injection pressures applied to the fluent plastic at the discharge or injection end of the heating cylinder must reach such plasticized charge to be injected by such pressures through the mass or column of material in the cylinder from the pressure driven plunger at the opposite or intake end.

With such heating cylinders the portions of the plastic material mass therein that are in direct contact with the hot surfaces of the cylinder at the start remain in contact with such hot surfaces until discharged from the cylinder as there are no movements of material within the mass by which portions in the interior thereof are moved to and replace such heated, exterior portions of the mass. Thus burning of such exterior portions of the plastic material and generation of gases within the mass may result, with portions of the plastic at the interior of the mass being incompletely plasticized or melted and discharged from the cylinder so that the charge injected into a mold is not uniformly plasticized but contains colder particles tending to lower the temperature of the heated particles.

In its efforts to overcome the foregoing major problems and the various problems ancillary thereto, the art has steadily worked in the direction of higher temperatures of heat conducted to and around the external or peripheral portions of a charge of plastic material in a heating cylinder in an effort to penetrate the necessary heat to the central or intermediate portions of the charge within the time limit allotted by the injection molding cycle for such heating. Thus the hazard of burning or overheating portions of the plastic in a charge thereof is increased with the increases in the heat applied to the charge. Similarly, the trend of the art is toward steadily increasing pressures per square inch for forcing a new, replacement charge into the heating cylinder passage arrangement and injecting the plasticized charge from the plastic previously charged into the heating cylinder, pressures up to the order of 30,000 pounds per square inch being utilized for this purpose in some instances. In attacking these problems the art has also resorted to various passage designs and arrangements of passages through which the charge of plastic material is to be forced with the intention of forming the plastic material of the charge into thinner layers or sections so that heat may penetrate through such layers or sections within the time limit imposed by the injection molding cycle in order to bring the plastic to the desired fluent state. The forming of the plastic material of a charge into such thinner section layers is generally carried out in the art by the use of so-called spreaders or "torpedoes" which provide an annular space or passage therearound to provide passages of extended axial lengths through which the plastic material is forced as relatively reduced thickness annular layers of plastic. But all of these heating cylinder passage designs and arrangements known to me, including such spreaders, tend to increase the resistance to passage of the charge therethrough and thus require increases in the pressures and power necessary to force the plastic material through the heating cylinder passages. Such increases in charging and injecting pressures have aggravated the existing problems of plastic burning and non-uniform plasticizing of the charge to be injected and have added problems and difficulties including the sharply increased power costs, as well as machine structure problems and costs in order to develop and apply such magnitudes of pressure per square inch.

The results are that in the commercial art the cost of injection molding machines is necessarily greater and the costs of operating such machines in terms of power, have been greatly increased. Such factors as overheating or burning and other harmful effects on the thermoplastic materials themselves from such high temperatures and high pressures have resulted in a tendency toward less efficient and unsatisfactory physical characteristics in the articles molded from the thermoplastics thus treated and conditioned. Thermoplastic materials so conditioned and plasticized tend to develop undesirable physical characteristics which can produce in articles injection molded therefrom non-uniform internal characteristics, undesirable grain, texture or crystal structure, internal strains and stresses causing breaking, fractures or cracks, and unsatisfactory pigmentation with discoloring and lack of uniformity in the color or shade intended for the article.

With the object of overcoming or substantially reducing the foregoing problems and difficulties, I have devised and developed a new principle of plasticizing or heating a charge of thermoplastic material in a heating cylinder of an injection molding, extruding, expressing or the like machine. In accordance with the new principles and the various heating cylinder constructions adapted to carry them out, I break up the primary or major columnar mass of thermoplastic material confined in the main flow passage in a cylinder to thereby reduce the radially uninterrupted portions of the central mass of the column so that the major mass in a cylinder takes the form of a relatively deeply fluted column. This result may be obtained in one form of heating cylinder by providing longitudinally extending ribs spaced apart around and extending radially into the primary or major passage to thus reduce the cross-sectional areas and the diameters of the central column of material that remains along the axis of the major passage between the inner edges of such radially inwardly extending ribs. Thus the surrounding portions of the charge so broken up are received in and are readily displaceable through the longitudinal passages formed by the spaces extending between adjacent ribs. In this manner not only is the resistance to passage of the larger diameter columnar mass of thermoplastic material reduced, but greatly increased areas of heat conducting surface are obtained which are in direct contact with the thermoplastic material of the charge. I then provide by a form of "strainer" construction for feeding or bleeding-off from and around the external portions of the mass of thermoplastic material in the passages between the rib portions, the melted or fluent material in direct contact with the hot surfaces of the passage defining structure. The melted, plasticized portions of the thermoplastic material thus strained or bled-off are then fed and flow through separate tributary channels formed around the main passages to the discharge end of such passages where they are mixed or rejoined with melted portions from the main passages to make up the plasticized charge for pressure injection into a mold. By this "straining" or bleeding-off action the exterior portions of the main mass of thermoplastic material are not permitted to remain at rest in direct contact with the hot surfaces of the passage defining structure but are displaced and strained therefrom and replaced by cooler portions of material moving radially outwardly from the adjacent interior portions of the mass. Thus overheating or burning is avoided and further, there is obtained a more complete plasticizing of the mass so that a more uniformly heated and plasticized charge is prepared for injection into a mold. There is thereby obtained a radial movement and displacement throughout the length of the mass of the main column of material of cooler portions from the interior of the mass outwardly to and replacing heated and melted portions of the mass around the exterior thereof which are strained off therefrom. The new principles of my invention by which such "strainer" action is obtained, as above generally outlined, are disclosed and claimed in my pending U.S. patent application Serial No. 390,879, and my present invention is directed toward improving upon and increasing the efficiency and of lowering the cost of heating cylinders embodying such principles.

One of the objects of my present invention is to provide a plasticizing or heating cylinder for carrying out the principles of my invention, as hereinbefore generally described, in which the main passage through which a charge of thermoplastic material is forced and in which it is plasticized is of constant effective internal diameters throughout the length of such passage to thereby eliminate the necessity for using a passage tapering from inlet end to discharge end or of locating obstructing structure such as spreaders in the main passage or passages.

In carrying out the foregoing general object my invention provides as a feature thereof, a regulating distributor at the discharge end of the major or primary passages through the cylinder by which fluent thermoplastic which has been bled off through the tributary channels from and along and around the column of thermoplastic in the main passages is mixed with fluent thermoplastic from the columnar mass in the main passages at the discharge end thereof in such a manner as to, in effect, provide a self-regulating feeding, mixing and distribution of the fluent material to make up therefrom the charge for injection into a mold.

Another object is to provide such a heating cylinder operating and functioning in accordance with the principles of my invention, as aforesaid, in which the regulating distributor is located substantially completely removed from the major passages through the heating cylinder so as to thereby eliminate obstructing structure through and past which cold and solid or unplasticized thermoplastic materials are required to be pressure forced.

A further object is to provide such a regulating distributor in the general form of a double cone suitably positioned in surrounding structure of the cylinder so as to provide between such surrounding structure and the distributor itself a series of flow regulating and fluent material mixing and distributing passages therearound to form the completely plasticized and fluent charge of thermoplastic for pressure injection from the cylinder into a mold.

Another object resides in increasing the heat conducting surface areas for direct contact by portions of the charge of thermoplastic material without imposing flow resisting structure in the main passages of the cylinder at locations therein at which solid or unplasticized material must be pressure forced therepast.

In carrying out this object of increasing the heat conducting surface area of a plasticizing cylinder unit of my invention, I have provided as a further feature of the present invention a design, construction and mounting of the fluent material forming charge regulating and distributing component as of heat conducting material with a supporting and positioning structure for such unit which is also of heat conducting material in direct heat conducting relation with the heated and conducting structure of the heating cylinder.

Another object is to provide a design and construction of plasticizing cylinder for thermoplastic materials by which overheating or burning of the plastic material being plasticized therein is substantially eliminated.

Further and general objects are to substantially increase the efficiency of heating cylinders by reducing the heat and power required for the operation of such a cylinder and the efficient plasticizing into a fluent charge of thermoplastic material forced therethrough while at the same time reducing the pressure and power required for the operation of such a cylinder with resulting substantial reductions in power and operating costs.

Another general object is to provide such a heating cylinder having the foregoing features and characteristics which can be manufactured at relatively low costs and which is adapted to designs and constructions capable of being used as replacement for existing and installed heating cylinders, as well as for incorporation in injection molding machines as original components thereof.

And a further object is to provide a heating or plasticizing cylinder design and functioning capable of adaptations not only to injection molding machine but also to various other machines and operations requiring the plasticizing of plastic materials, such as plastic expressing, extruding and such like machines.

With the foregoing and various other objects, features and results in view my invention consists in certain novel designs, constructions and arrangements and in combinations of components, all as will be more fully referred to, specified and explained hereinafter.

Referring to the accompanying drawings in which similar reference characters refer to corresponding parts and elements throughout the several figures thereof:

Fig. 1 is a longitudinal section through one example embodiment of a heating cylinder incorporating the principles and features of my invention, a portion only of the injection plunger of an injection molding machine being shown in its operative relation with the charge intake end of the cylinder.

Fig. 2 is a transverse section through the heating cylinder of Fig. 1 taken as on the line 2—2 thereof.

Fig. 3 is a transverse section through the heating cylinder of Fig. 1 with the regulating distributor component of the invention removed, the section having been taken as on the line 3—3 of Fig. 1.

Figure 4 is a perspective view of the regulating distributor component of my invention in the form thereof as incorporated in the example embodiment of heating cylinder of Fig. 1.

Fig. 5 is an enlarged longitudinal sectional view through the discharge or injection end of the heating cylinder of Fig. 1.

Fig. 6 is a transverse sectional view taken as on the line 6—6 of Fig. 5.

Fig. 7 is a transverse sectional view taken as on the line 7—7 of Fig. 6.

As an exemplification of the principles and features of my present invention I have selected from among various other forms, designs and constructions by which my invention may be expressed, an embodiment of a plasticizing or heating cylinder which is illustrated in the accompanying drawings as adapted for incorporation in an injection molding machine as the component thereof for heating to fluent condition charges of thermoplastic material for injection by the machine into a mold. The particular form and embodiment herein illustrated and described is offered primarily as an example and not in all respects a limitation to all of the various features thereof or to the specific forms of such features here disclosed. This illustrated example provides a heating cylinder which incorporates and which efficiently operates with a main axial flow passage therethrough which is straight in the sense that this passage throughout the major portion of its length has substantially constant or uniform minimum and maximum effective internal diameters. While the provision of such a straight or constant diameter main axial passage is one of the contributions of my invention for increased efficiency and which makes possible operation of the cylinder with substantially lowered pressure and heat requirements for effective plasticizing, my invention is not necessarily limited to such basic so-called straight main passage or passage arrangements. Due to other factors and features of the invention substantially improved and more efficient results may be obtained over prior heating cylinders, with a heating cylinder of the invention if the main passage or passage arrangement is provided as of a basic tapering or conical form. Hence, in the interpretation of this disclosure of the example heating cylinder of the invention it is not intended that the other factors which contribute to the new results in increased efficiency are necessarily and essentially limited to the so-called straight passage or passage arrangement of the example, as the same factors which contribute to the results when in the combination with the so-called straight passage type will contribute toward increased efficiency of results when combined in a structural and functional interrelationship with the main passage or passage arrangement of the tapering or conical types. However, this is not to detract from the further and increased advantages which the so-called straight passage or passage arrangement of my invention attains in terms of reduced charging and injection pressure requirements and of reduced costs of manufacturing such a cylinder, all while insuring complete and uniform plasticizing of the thermoplastic charges.

In the illustrated example of the invention as presented in Fig. 1, the complete plasticizing or heating cylinder unit assembly is identified generally in its entirety by the reference character A. As this example embodiment of heating cylinder A is designed for incorporation in a standard commercial type of injection molding machine as the thermoplastic charge plasticizing component thereof, it is not deemed necessary to disclose herein such an injection molding machine in view of the complete familiarity of the art with such machines. Therefore, in Fig. 1 the heating cylinder A is shown with only a portion of the charge injecting, pressure fluid driven plunger P of an injection molding machine, in its operative association and position relative to the heating cylinder A and the intake end of the charge receiving passage arrangement thereof, when the cylinder A is in mounted operative position in the machine. As will be familiar to the art, the plunger P withdraws or retracts to a charge receiving station where a measured charge of thermoplastic material is fed into the cylinder (not shown) in which the plunger P reciprocates. Such charge is fed to a position at the front end of the plunger so that on the charging and injecting stroke of the plunger the charge is forced under pressure into the intake end of the passage arrangement of the cylinder A against the previously formed column of thermoplastic material in and extending through the passage arrangement so that the plasticized and fluent charge at the opposite, discharge end of the cylinder A is pressure forced therefrom and injected into a mold with which the cylinder A is operatively connected in the usual manner familiar in the art.

The plasticizing or heating cylinder A of the example embodiment of my invention is constituted by a body assembly which includes the shell 10 of cylindrical form having a substantially constant external diameter throughout the major length thereof from the discharge or injection end to adjacent the intake end where the shell is formed and provided in this instance with an integral head-forming flange 11 of increased external diameters extending radially outwardly therefrom and therearound. The shell 10 is preferably formed of a good heat conducting material, such as steel, having good heat transfer characteristics for the transmission of heat therethrough by conduction from a plurality of heating elements in the form of the bands 12 wrapped around the exterior of the sleeve to form, in effect, a substantially continuous heating envelope or wrapping for the shell in direct heat transfer relation therewith from the discharge or injection end to the head flange 11 at the intake end thereof. In the outer side of the enlarged diameter head flange 11 of the shell 10 there may be inset therein an annular electrical heating component 14 of more or less standard or conventional form and location as generally used with plasticizing cylinders for injection molding machines. The shell or body 10 at the intake, headed end 11 thereof, is adapted to be attached and connected to the discharge end of the cylinder of the injection molding machine (not shown) in which the plunger P operates. This intake end of shell 10 is provided with a circular recess 20 therein of substantially greater diameter than the diameter of the plunger P for receiving and mounting therein the discharge end of the cylinder or sleeve assembly (not shown) in which the plunger P operates. A bore or circular recess 21 in the form of a counterbore from recess 20 extends inwardly therefrom in axial alignment therewith. The inner end of the circular recess or bore 21 is axially aligned with a circular opening 22 constituting the entrance end of the main chamber 23 which extends axially through the shell 10 from the opening 22 to adjacent the opposite, injection end of the heating cylinder A. This chamber 23 which extends axially through the shell 10 is, in this example, formed as a straight, circular passage or bore of substantially constant diameter from the circular opening 22 to a location adjacent the opposite or injection end of the shell, as will be clear by reference to Fig. 1. There is thus provided the straight, constant diameter chamber 23 which is of circular cross-section with the wall of the shell 10 which surrounds and defines and forms this constant diameter chamber presenting a smooth, unbroken and uninterrupted surface 24 therearound throughout the length of the chamber. This surface 24 is precisely machined and finished to receive and engage with a shrink or press fit the complementary exterior surface of a sleeve member component of the assembly which is mounted therein, as will be referred to and described hereinafter. This sleeve chamber 23 extends axially through the sleeve 10 from the opening 22 at the intake end of the heating cylinder A to a location indicated at 23a on Fig. 1 from which the diameter of the chamber progressively increases to form the section 23b of the chamber as slightly flaring or tapering outwardly at, say, an angle of approximately 2° to a counterbore 25 through the discharge end of the shell. The counterbore 25 is of greater diameter than and continues the chamber outwardly through the rear end 26 of shell 10. The counterbore 25 is internally threaded at 26a and forms and defines a circular opening 27 through the shell end 26 which is coaxial with the chamber 23 and the circular opening 22 and counterbore 21 at the opposite end of the shell.

In accordance with my invention I provide a sleeve member 30 mounted in and substantially filling and occupying the straight, constant diameter chamber 23 which extends axially through the shell 10. This sleeve 30 includes a body 31 of cylindrical external form and contour providing the cylindrical exterior surface 32 therearound complementary to the cylindrical, constant diameter surface 24 which forms and defines the passage 23 through the shell 10. This cylindrical exterior surface 32 may be precisely machined and finished so as to form a sealing engagement with the complementary surface 24 of chamber 23 when the sleeve member 30 is mated with and nested with a shrink fit in assembled relation in the passage 23 of the shell 10.

The sleeve member 30 at the intake end thereof is provided with a mounting head in the form of a radially outwardly extending flange portion 33 therearound which has an external diameter to form a relatively tight, nesting fit in the counterbore 21 at the entrance or intake end of the shell 10. Any suitable attaching or securing means may be provided if found necessary to attach head 33 of the sleeve 30 to adjacent structure of the shell 10. The length of the sleeve member 30 from the inner side of the head 33 thereof inwardly through chamber 23 of the shell 10 is such that the inner end edge 34 is located in the chamber 23 spaced a distance inwardly thereof from the end of chamber 23 and the location 23a therein at which chamber 23 is continued by the outwardly tapering section 23b thereof, as will be clear by reference to Fig. 1.

The sleeve member 30 is of general tubular form and is constructed and designed to provide a generally straight or constant internal diameter basic passage 40 therethrough which opens at its intake end through the head 33 and at its discharge end through the end 34 of the sleeve member. The intake end of this basic passage 40 is provided by the circular opening 41 through head 33. The sleeve member 30 is formed of a suitable heat conducting material, preferably, as in the example hereof, a pressure cast beryllium copper, and as the sleeve member is in direct contact in assembled position thereof with the steel or other heat conducting material shell 10, it is apparent that heat will be transmitted from the heating bands or units 12 which are wrapped around the exterior of the shell 10 by conduction directly to and through the sleeve member to the inner surfaces thereof within and defining the basic straight passage 40 thereof.

The passage 40 through the sleeve member 30 thus provides as a basic or origin form, a straight cylindrical surface along the length of and defining the constant diameter passage for minimum resistance displacement or flow of the thermoplastic material constituting the charge which is to be forced through and plasticized in the passage from the intake opening 41 thereof to the discharge opening 42 at the opposite end of the passage. In this example the sleeve member 30 has the discharge end of the body 31 thereof tapered or inclined radially outwardly therearound to provide the annular tapered surface 43 which terminates in the circular opening 42 coaxial with but of greater diameter than the circular opening 44. Circular discharge opening 42 has the diameter of the maximum internal diameter of the basic passage 40, while circular opening 44 has the external diameter of the sleeve member 30. Thus constructed and assembled in the shell 10, the sleeve member 30 extends through the shell with its end discharge opening 44 located positioned a distance inwardly from the location 23a in the chamber 23 of the shell at which the outwardly tapering section 23b of chamber 23 originates. There is thus formed within the shell 10 between the discharge ends 42 and 44 of the sleeve member 30 and the counterbore 25 in the discharge end of the shell, a circular chamber 50 into which the passage 40 of the sleeve member 30 opens and discharges.

With the basic straight, constant diameter form of the base surface 45 of the passage 40, as a surface of origin, I generate and develop therefrom a series of rib members 60 disposed longitudinally of and extending radially inwardly from the basic surface 45 of the passage 40. Referring now to Figs. 2 and 3 in connection with Fig. 1 of the drawings, I provide in this specific example twelve (12) of these rib members which are cast or otherwise formed integral with the sleeve member 40 and which are spaced apart equal angular distances around the axis of the passage 40. As will be clear from Figs. 2 and 3, each of these rib members 60 has substantial depth radially of the sleeve member and is of general triangular form in cross-section. Due to the radial depth of each of the ribs 60, I have thereby substantially reduced the diameter of the remaining central or axial columnar passage identified generally by the reference character 46 in Fig. 2 which is formed between and defined by the longitudinally extending inner edges 61 of the rib members 60. In this specific instance I have obtained this result of reduced diameter for the central portion or column of passage 40 by providing the rib members as of a depth dimension greater than one-half (½) the dimension of the radius of the basic circular passage 40 in the sleeve member, as will be clear by reference to Fig. 2. Each of the rib members 60 extends from a location within the passage 40 of the sleeve member 30 spaced a distance inwardly from the intake opening 41 of the passage to the inner, smaller diameter discharge opening 42 of the passage at the opposite end thereof. Each of the ribs 60 is in this particular example of constant depth or radial dimension relative to the sleeve member throughout the major portion of the length thereof, as will be clear by reference to Fig. 1. However, the end portion of each rib member 60 at the intake end of the passage 40 is formed of progressively decreasing depth toward the intake end of the passage to provide an inclined inner edge surface 62 therefor which in this instance is at an angle of approximately 20° to the plane of the surface 45 of the passage with the surface 62 joining and merging into the surface 45 of the sleeve member. Preferably these inclined edge surfaces 62 adjacent the intake end of passage 40 are flattened and of increasing widths outwardly toward the intake end of the passage due to the triangular cross-section of the rib members 60. Similarly, each of the rib members 60 at the discharge end of sleeve member 30 and the passage 40 therethrough has the end thereof inclined outwardly to provide the inclined surface 63 which lies in the plane of and forms an inward continuation of the inclined surface 43 at the discharge end of the sleeve member 30. These inclined end surfaces 63 of the rib members 60 are relatively flat or planar surfaces which progressively increase in width outwardly in the manner similar to the form taken by the inclined surfaces 62 of the rib members at the intake end of passage 40. These inclined end surfaces 63 of the rib members 60 at the discharge end of the sleeve member are shown particularly in Fig. 3 of the drawings.

Thus the rib members 60 with their substantial depths radially into the basic passage 40 provide the relatively narrow passages 65 therebetween which radiate out from and are spaced equal distances apart around the central uninterrupted portion or column passage 46 of the basic passage 40. Each of these passages 65 extends longitudinally for the full length of the system of rib members without obstruction therein to provide the smooth surface approximately parallel opposite side walls 66 with the bottom wall 67 formed on a radius transversely of a passage 65, thus providing a trough-like rounded bottom or outer wall for each passage 65 between adjacent rib members 60. With the rib member formation and the dimensions of the heating cylinder sleeve member 30 of this example, the passages 65 between rib members 60 decrease but slightly in width progressively outwardly so that these passages closely approach equal or constant width throughout their depth. Thus formed and constructed, the rib member system and arrangement within the sleeve member 30 defines and provides a passage system therethrough which in cross-section, as shown in Fig. 2, is in the form of a cross-section through a deeply fluted column.

The system of rib members 60 and the central passage 46 with the passages 65 radiating therefrom and therearound thus substantially breaking up radially the mass and the cross-sectional area of the column of material forced into and through sleeve member 30, in the central passage 46, contributes substantially to the plasticizing capacity and efficiency of a cylinder unit, such as the unit A of my invention. However, in accordance with the principles of my invention I provide around the exterior or outer side of the sleeve member 30 a series of twelve (12) grooves or channels 70 extending axially along the sleeve member from locations adjacent but spaced inwardly a distance from the flange 33 of the sleeve member. The forward ends of the channels 70 at the intake end of the sleeve member terminate in a plane transversely of the sleeve member located spaced a slight distance inwardly from the forward or intake ends of the inclined portions 62 of the rib members 60, as will be clear by reference to Fig. 1. The channels 70 extend from the foregoing locations adjacent the intake end of the sleeve member to and through the inclined or tapered surface 42 at the discharge end of the sleeve member. In this example these channels 70 are spaced equal distances apart around the sleeve member located in positions along and radially aligned with the bottom walls 67 of the channels 65, respectively, which are formed by and between the rib members 60. Such positioning and location of the channels 70 will be clearly apparent from Figs. 2 and 3. The depth of the channels 70 is in the example embodiment here of approximately one-half the distance between the exterior surface 32 of the sleeve member and the inner end wall of a passage 65 between the rib members 60. These channels 70 open without any obstruction therealong through the exterior surface of the sleeve member throughout their lengths and each is placed in fluent material receiving communication with the respective passage 65 along which it is located by a plurality of feeder or bleed-off ducts 71 formed through the body 31 of the sleeve member between a passage 65 and the channels 70 along that passage. In the specific heating cylinder A of this example I have provided seventeen (17) of such feeder ducts 71 spaced equal distances apart along the length of a channel 70 with the ducts inclined radially outwardly from the passage 65 into which they open at their inner ends to the channels 70 in the direction of flow of the thermoplastic material through the sleeve member. In order to prevent pocketing of thermoplastic material at the intake end of each channel 70 which is located at the intake end of the sleeve member 70, I provide the feeder duct 71 in a location so that it discharges directly into the end of the channel (see Fig. 1). By this arrangement I separate and feed-off from and along the inner (outer) or bottom sides of the passages 65 thermoplastic material which has been brought to fluent condition due to the direct contact of the "flutes" of material which have been removed or separated-off from and around the central column of material fed into the sleeve member under pressure by the plunger P on its injection stroke. Such bled-off fluent material is forced under pressure by the injection stroke of plunger P, through the channels 70 where it is discharged for further conditioning in the chamber 50 in the shell 10 at the discharge end of the sleeve member 30.

With the shell 10 and the sleeve member 30 so designed and constructed and assembled into the unit as hereinabove described, the chamber 50 into which the discharge ends of the channels 70 and of the central columnar passage 46 open, is of inwardly tapering conical form at the inner side thereof due to the inward taper or conical form of the sleeve member 30 at its discharge end. Thus the channels 70 discharge into this conical form of the chamber 50 at the peripheral portion of the base thereof while the central passage 46 of the sleeve member opens into such chamber at the inner side or apex area thereof.

The discharge or injection end of the shell 10 and the chamber 50 are closed in this example by an end closure member 80 in the form of a nut or plug member which is externally threaded at 81 and which is threaded into assembled position in the internally threaded counterbore 25. The length of the nut 80 is such that in assembled position thereof it projects outwardly a distance beyond the end 26 of the shell 10 as a reduced diameter cylindrical head 82 around which may be wrapped in direct heat transfer relation therewith a heating unit 12a of the band type familiar in this art. The nut 80 is provided with an axial bore therein forming a cylindrical section discharge or injection passage 83 which at its outer end opens into an enlarged diameter counterbore 84 coaxial therewith. Counterbore 84 is internally threaded. An injection nozzle N having an externally threaded base 85 is mounted in the nut 80 by threading the base thereof into the counterbore 84 with the nozzle projecting outwardly from the nut. The nozzle N has a bore 86 axially therein of the same diameter as the diameter of the discharge passage 83 so that this bore 86 forms an outward continuation of the latter passage and is in injection communication with an injection orifice 87 formed axially through the nozzle N. The axial passage 83 in the nut member 80 at its inner end opens into and is continued inwardly toward the chamber 50 in the shell 10 as a radially outwardly and progressively tapering chamber 88 of cone form which opens through the inner end of the nut member 80 as the circular base opening 89 having a diameter substantially equal to the diameter of the adjacent outer side of the circular chamber 50 formed within the shell 10. The angle of taper of the conical chamber 88 which forms the inward continuation of the discharge passage 83 in the nut member 80 may be taken to be of the order of approximately 50°, while the angle of taper of the conical inner portion of the chamber 50 may be taken to be of the order of approximately 45°.

The nut member 80 has the inwardly projecting reduced diameter neck 80a which has its external circular surface 80b therearound tapered radially inwardly at an angle substantially equal to the angle of taper outwardly of the circular surface 23b of the main passage 23 through the shell 10 and this neck 80a is formed to provide a circular relatively sharp inner edge 80c therearound by the merger or joining of the inwardly tapered surface 80b of neck 80a and the outwardly tapering or inclined conical surface of the conical chamber 88 in the nut member 80. The external diameters of the circular surface 80b are such that the neck 80a extends and can be tightly wedged into the section 23b of the main chamber 23 with the nut member 80 in its assembled position tightly threaded into the counterbore 25 in the shell 10. Thus the sharp inner edge 80c of the neck 80b merges and, in effect, fairs into the surface of the passage 23, thus forming an effective seal between the neck 80b of nut member 80 and the shell 10 into which it extends. The tightness and resulting effective seal between the surface 80b of the neck 80a and the surface 23a of the shell 10 is obtained by tightening up on the nut member 80 with the resulting inward wedging action between the engaged tapered surfaces 80b and 23a.

Following an important principle of my present invention, I provide for a regulated mixing or bringing together and distribution in the chamber 50 and therefrom through the chamber 88 and the discharge passage 83 into the nozzle N, of the fluent or plasticized portions of the thermoplastic material pressure discharged from the tributary channels 70 and the discharge openings of the central passage 46 and passages 65 of the sleeve member 30. Such mixing and distribution is carried out in this example embodiment of my invention by providing a regulating distributor unit 90 in the form of a double cone body which is rigidly fixed and secured in position in the chambers 50 and 88 between the discharge end of the sleeve member 30 and the nozzle mounting nut member 80. This distributor member 90, referring now to Fig. 4 in connection with Fig. 1, is formed of a material having good heat conducting characteristics, such as beryllium, and may be cast in the form of a double cone body with the exterior surfaces thereof suitably finished, if found necessary. I then provide a mounting and positioning system for this heat conducting material distributor member by which heat is transmitted directly by conduction from the shell, the sleeve member and the nut member assembly to the distributor and from the distributor and such mounting arrangement directly to the thermoplastic material which surrounds and is in direct contact with the member 90 and its mounting arrangement. This regulating distributor 90 is formed of a circular base forming intermediate portion 91 having an external diameter less than the internal diameter of the central base portion of the chamber 50 with a cone portion 92 extending outwardly from one side of the base portion 91 and a cone portion 93 extending outwardly from the opposite side of the base portion 91, these cone portions 92 and 93 being coaxial with the base portion 91. The cone portion 92 extends outwardly from the base portion 90 at an angle of taper of approximately 45° and then merges into and is continued by a conical stem or tail portion 92a having an angle of taper flatter, that is, less than the approximate 45° angle of taper of the cone portion 92, say, for example, an angle of taper of approximately 30°. Thus the distributor member 90 at one side thereof is provided with what is, in effect, a compound cone portion 92—92a with the external diameters of the cone portion 92 less than the internal diameters of the inclined or tapered discharge ends of the rib members 60 of the sleeve member 30 and with the cone portion 92a having its maximum base diameter less than the diameter of the central passage 46. The cone portion 93 at the opposite side of the base portion 91 of the distributor member 90 has an angle of taper of approximately 60° and a maximum base diameter at the portion 91 which is less than the internal diameter of the circular opening 89 of the chamber 88 in the nut member 80.

The regulating distributor member 90 constituted by such double cone construction is mounted in position centered in the chambers 50 and 88 by a system and arrangement of heat conducting material pads or spacer pedestals 94 and 95. The heat conducting material pads 94 are positioned and located on the inclined ends 63 of the rib members 60, being in this example cast or otherwise formed integral therewith and are carried by the sleeve member 30 as components thereof. One of these pads 94 is provided on the end 63 of each of the rib members 60 so that there are in this instance twelve (12) of these pad members. The pads 95 in this instance are formed and provided on the outer or apex portion of the cone 93 of member 90, being preferably formed integral therewith. In this example embodiment of a heating cylinder A of my invention I have provided four (4) of these pads or pedestals 95 located and spaced equidistant apart around the cone portion 93 of the distributor 90. The pads 94 are of general diamond shape in cross-section and project outwardly and inwardly from the inclined surfaces 63 at the discharge ends of the rib members 60 and they provide on their outer sides the seating surfaces 94a which are adapted to receive and be engaged by the cone portion 92 of the distributor member 90 when the latter is in assembled position in the chambers 50 and 88. Each pad 94 projecting from the end surface 63 of a rib member 50 has a length less than the distance between the exterior surface 31 of the sleeve member 30 and the inner longitudinal edge 61 of the rib member and is positioned and located thereon to provide spacing between the opposite ends of the pad member and surface 31 and edge 61, respectively. Each pad 94 has a width less than the width of the end surface 63 of the rib member at the base of that member and is located along the center of the rib member so that substantially equal spacing is provided between the opposite sides of the pad member and the adjacent side surfaces 66 of the rib member.

Each of the four (4) heat conducting material pads 95 on the cone 93 of the distributor member 90 is of general diamond shape in cross-section, as will be clear by reference to Fig 4, and each provides a seating surface 95a on the outer side thereof adapted to receive and be engaged by the conical surface of the nut member 80 which defines and forms the conical chamber 88 therein. These four (4) pads 95 are positioned at the outer, apex end of the cone 93 and are located thereon spaced equidistant, that is 90°, apart therearound. Each pad 95, while of general diamond shape in cross-section through the base portions thereof fairs outwardly from the base portions to a generally streamline or "teardrop" cross-section, as illustrated particularly in Fig. 1. Thus formed and designed, each pad 95 has its trailing portion 95b extended to the apex point 93a of the cone 93 with this trailing portion 95b having the opposite sides thereof inclined inwardly and outwardly and diverging from the cone apex point 93a. The base of each pad 95 has a length greater than the length of the seating surface 95a and the maximum length of a pad, as defined by the base, is in this example slightly greater than one-half the length of the axis of the cone 92 from its apex point 93a to its base where it joins or merges with the base portion 91 of the distributor member 90.

The regulating distributor member 90 is mounted and assembled in fixed rigid position in the chambers 50 and 88 and the passage 46 of the sleeve 30 by securing and clamping it between the discharge end of the sleeve 30 and the intake portion of the nut member 80 as defined by the conical chamber 88. In its assembled operative position in the heating cylinder A of this example, referring now to Fig. 1, in particular, the exterior surface of the cone portion 92 of the distributor member 90 is seated on and against the seating surfaces 94a of the twelve (12) heating material pads 94 on the rear ends of the rib member 60 of sleeve member 30 and with the conical stem 92a which projects from cone portion 92 extending a distance into the central columnar space 46 of the sleeve member 30 in axial alignment therewith. Thus positioned, the base portion 91 of the distributor member 90 is positioned and located in the circular chamber 50 in and defined by the discharge end of shell 10 and forms such circular chamber into the annular passage 100 around base portion 91 of the member 90. The cone 92 of the distributor member 90 seated on the surfaces 94a of the pads 94 is spaced thereby from the end surfaces 63 of the ribs 60 with the passages 66 between the rib members 60 discharging freely and without obstruction into the passages 101 formed between the pads 94 and the conical exterior surface of the cone 91. The pads 94 with the end surfaces 63 of the ribs and the conical surface of the cone 92 provide the passages 101 completely around the distributor member 90 with these passages at their intake ends opening into the annular passage 102 formed by and around the stem 92a in the discharge end of the central passage 46 and at their discharge ends opening for discharge therefrom into the annular passage 100 around the base portion 91 of the distributor member 90. The tributary channels 70 around the exterior of the sleeve member 30 also open at their discharge ends into and at equidistant locations around the annular passage 100 at the discharge ends of the passages 101 between pads 94 around the cone 92 of member 90. Preferably, as illustrated in Fig. 1, the depth of the passages 101 between the pads 94 is slightly less than the depth of the annular passage 100 surrounding the base portion of the distributor member 90. At the intake ends thereof the passages 101 between the pads 94 open into and receive fluent material from the annular passage 102 around the stem 92a in the central passage 46 of sleeve member 30, with this passage 102 being of progressively increasing depth around the conical stem 92a inwardly of passage 46 to the full diameter of the passage 46.

In assembling position in the heating cylinder unit A, as aforesaid, and with the cone 92 of distributor member 90 seated on the pads 94 at the discharge end of the sleeve member 30, the cone portion 93 extends rearwardly in the direction of discharge through and in axial alignment with the conical chamber 88 of the nut member 80 with the apex point 93a thereof spaced a distance inwardly from the intake end of the discharge or injection passage 83 of the nut member 80. Thus positioned, the heat conducting material pads 95 of the cone 93 of distributor member 90 have their seating surfaces 95a engaged and seating on and against the conical surface of the nut member 80 which defines and forms the conical chamber 88. The depth of the pads 95 is such that when seated and engaged against the conical surface defining the chamber 88 and with the cone 92 seated on the rib member pads 94, the distributor member 90 and cone 93 are centered in the chamber 88 in axial alignment therewith and with the passage 83 from chamber 88 to the passage 86 of the nozzle N. Thus, the conical chamber 88 is formed into an annular passage 102a around cone 93 between the base portion 91 and the pads 95 and an annular passage 103 at the apex end of cone 93 with these passages 102a and 103 being joined in communication by the four (4) passages 104 formed between the pads 95. It is to be noted that due to the differences in the angles of taper between the conical surface of nut member 80 which defines the chamber 88 and the cone 93 of the regulating distributing member 90, the passages 102a, 104 and 103 progressively increase in depth or width radially of the cone 93 from their origin at the base 91 of member 90 to the apex end or point 93a of cone 93. This progressive increase in depth of these passages is in this example such that the width of the passage 103 at its discharge end at the apex point 93a of cone 93 is approximately twice the depth of the passage 102 at its origin location at the base portion 91 of the distributor member 90. It will be further noted that due to the angle of taper of the cone 93 the depth of the passage 102a at the base 91 is slightly greater than the depth of the annular passage 100 around the base 91 and thus is substantially greater than the depth of the passages 101 between the pads 94 and the cone 92. Hence, the flow paths for the plasticized, fluent thermoplastic from the central passage 46 and the passages 65 radiating outwardly therefrom and from the channels 70 around the sleeve member 30 increase in depth from the intake ends of passages 101 to their discharge from the annular passage 88b into the injection passage 83 which discharges into the nozzle N.

Attention is also directed to the fact that by forming the pads 94 on the ends 63 of the ribs 60 and locating and positioning these pads on radii of the sleeve member 30, the passages 101 formed therebetween have relatively wide inwardly diverging intake mouths 101a, while, for the major portion of each passage along the discharge end of a sleeve passage 65, the passage 101 is of more uniform widths to substantially conform to the shape of the discharge opening from such sleeve passage 65, as will be apparent from Fig. 3. In this specific example form the passages 88c formed between the pads 95 on the cone 93 of distributor member 90 also have outwardly diverging intake mouths and then tend to be of more uniform widths from such diverging mouths to the discharge ends thereof, as indicated by Fig. 4. However, due to the greater width of the passages 88c such form thereof may be said to have less effect on flow and on injection discharge therefrom than does such shape and form on the narrower and greater number of passages 101 around the cone 92 of the distributor member 90.

With a plasticizing or heating cylinder incorporating the principles and the features of my invention, such as the heating cylinder unit A of this example, assembled in operative relation in an injection molding machine, the conventional operation of such a machine remains unchanged except that a more efficient plasticizing of the charges of thermoplastic material are obtained with an increasing uniformity in the fluent or plasticized condition of the thermoplastic throughout the mass of a charge. Such results make possible the use of lower injection pressures and lower degrees and quantities of heat. In the starting operation of a machine incorporating the heating cylinder A of this example, the initial charging stroke of the pressure fluid actuated plunger P of the machine forces the charge into and through the central passage 46 of the sleeve member 30 and into the passages 65 between the ribs 60 which radiate out from and around passage 46 substantially throughout the length thereof and thus radially break up the mass of the charge. With the sleeve member passages thus filled with thermoplastic material there is formed in the sleeve member 30 a deeply fluted columnar mass of material having a central unbroken column formed and contained in the passage 46 of a small and greatly reduced cross-section throughout the length of the passage.

The charge of material thus disposed in and filling the sleeve member passages is then subjected to heat from the heating units 12 on the shell 10 by direct conduction of heat through the shell to the body 31 of the sleeve member and through the rib members 60 to the areas of the thermoplastic mass in direct contact with the rib members. Due to the radial depth of the rib members 60 and the aggregate surface areas thereof which are placed in direct contact with the relatively thin "flutes" of material in the passages 65, there is a rapid and uniform transmission of heat to such flutes of material so that they may be quickly brought to the required plasticized, fluent condition for ready, minimum resistance displacement and flow of the portions thereof in and along the bottom walls 67 of the passage through the feeder ducts 71 into the channels 70 as the thermoplastic material in these passages 65 is displaced under pressure and replaces portions of thermoplastic forced from the passage 46 thereinto. Similarly, due to the small diameters and cross-sectional areas along the column of material charged into the passage 46, such material is more rapidly heated and raised in temperature toward the required fluent condition so that the portion thereof which might otherwise remain in unplasticized or partial solid state is substantially reduced and a quantity of the material of this column is, therefore, in a required plasticized or fluent state for pressure flow thereof from the discharge end of the passage and into the distributing passages 101 at and around the inner cone portion 92 of the regulating distributor member 90. Because of the breaking up into the deeply fluted column form of the mass of thermoplastic material charge which is forced into the sleeve member 30 and the resulting substantially increased aggregate area of heat conducting surface in direct contact with the mass of material and the relative thinness of the central column and the flutes of material radiating therefrom, it is found that substantially lower degrees and quantities of heat are required in a given period of time with a given quantity of charge to obtain efficient and uniform plasticizing of the charge with substantially reduced power costs.

Thus, while a charge of the thermoplastic material is in and filling the passages of the sleeve member 30 during the retraction stroke of the plunger P preparatory to its following injection stroke, the plasticizing of the material to an efficient extent is taking place by the heat applied thereto by conduction from the heating units 12. On the next injection stroke the plunger P forces a new charge of material in dry, solid granular form into the intake end of the sleeve member 30 through the intake opening 41 and against the end of the fluted column of material previously charged into the sleeve member. The outer portions of plastic in and along the passages 65 in direct contact with the heated surfaces of the rib members are melted and forced freely in such fluent condition through ducts 71 into channels 70 with such strained-off fluent material being continuously replaced by cooler material from the inner portions of the passages. In this manner danger of material burning is substantially eliminated by the movements progressively radially outwardly of the inner portions of material to replace the outer portions that have been melted and strained-off into the tributary channels.

The pressures exerted by the plunger P on its combined charging and injection stroke to the new charge of solid granular thermoplastic material must be transmitted through that charge to and through the deeply fluted column of plasticizing material previously charged into the heating cylinder by the plunger. And these pressures, after overcoming the total resistance to displacement offered by the material in the heating cylinder are then transmitted to the charge of fluent, plasticized thermoplastic at the opposite end of the cylinder for discharge therefrom and injection through the nozzle N into a mold with which that nozzle is connected. On the charging and injecting stroke of the plunger P and the forcing of the new charge of cold, granular material into the intake end of the main passage 40 of the heating cylinder assembly, the exterior portions of the thermoplastic material in the central passage 46, the "flute" passages 65, the feeder ducts 71, and the tributary channels 70, will have been heated and brought to fluent condition so that a minimum of pressure is required to displace the mass in the heating cylinder to and through the injection end of the cylinder. As the pressure is applied to this mass and it is displaced axially through the cylinder toward the regulating distributor component 90, the fluent material in and along the bottoms of the passages 65 will be expressed or strained from the central columnar mass and bled-off therefrom into the tributary channels 70 through the feeder ducts 71 and replaced by the radially outwardly forced inner portions due to the retarding effect of the distributor at the injection end of the cylinder. Thus a heating cylinder embodying my invention, as expressed in this example, is aptly referred to as of a "strainer" type.

The portions of fluent material from passage 46 and the passages 65 radiating outwardly therefrom are discharged into the relatively narrow passages 101 around the cone portion 92 of the distributor member 90 while the fluent portions which have been "strained" or "screened-off" and expressed into the tributary channels 70 are discharged from the inner ends of such channels into the passages 101 around the base portion of the distributor member 90 where such material is rejoined and mixed with the fluent material from passage 46 and passages 65 for making up the charge of completely plasticized, fluent thermoplastic material for injection into a mold. From the passages 100 the fluent material is then forced under the pressures transmitted thereto through the mass of material in the heating chamber from the plunger P, into and through the passages 102, 104 and 103 around the cone portion 93 of the distributor member 90. From the passage 103 this fluent material is forced under pressure outwardly through passages 83 and 86 and injected therefrom into a mold through the injection orifice 87 of the injection nozzle N. Due to the arrangement and dimensional relationships between the passages 101, 100, 102, 104 and 103, relative to the discharges of the passages 46, 65 and 70 and the intake to the discharge passage 83, this distributor member 90 tends to automatically regulate the joining or merging flows of fluent material from the sleeve member passages 30 to make-up the fluent charge for injection from the nozzle N. It is to be particularly noted that heat is continuously directly transmitted to the relatively thin section flows of fluent material around the distributor member 90 through the heat transmitting surfaces of the shell 10, sleeve member 30, nut member 80 and the distributor member itself through the heat conducting pads or spacer pedestals 94 and 95, thus insuring steady, continuous and uniform distribution of heat to the fluent charge right up to its point of injection discharge by the nozzle N.

By the arrangement of a heating cylinder of the invention, as expressed, for example, by the heating cylinder A here disclosed, a minimum quantity or portion of the incoming cold, solid thermoplastic material charge remains after entry into the major passages of the sleeve member 30 to be pressure forced through such passages so that the inherent resistance of the material in its solid state is substantially reduced to thereby reduce the total resistance offered by each charge pressure forced into the sleeve member 30. The incoming cold, solid thermoplastic material replaces the fluent material bled-off from the external portions of the material previously in the heating cylinder which is bled or strained off into the channels 70 and also replaces the fluent portions of the material in the heating cylinder discharge from the main passage 46 and the passages 65 at the distributor member 90. Thus, due to the fact that the mass of material in the main passages provided by the sleeve 30 substantially over the major portion of the resistance areas against which it must be pressure displaced is in fluent, plasticized condition, such fluent material acts, in effect, as a "lubricant" for the mass. During the pressure charging the major portions of the incoming cold, solid charges are forced radially from the central passage 46 into the channels 65 between the ribs 60 to displace fluent material strained off from these passages into the tributary channels 70, and as a result of such breaking up of the incoming mass the replacement portions thereof quickly plasticize and become fluent soon after charging into the heating cylinder.

While in the example embodiment hereof twelve (12) rib members are provided in the main passage, it is not thereby intended to limit my invention to any particular number, radial depth or spacing of the rib members. However, it is my present belief that the greater the radial depth within practical limits, the greater the breaking up and thinning of the material and the greater the efficiency of the heating cylinder. Similarly, the invention is not limited to the number of spacing pedestal or pad members 94 on the inner ends of the rib members, or to the formation of such pad members on the rib members, as if desired they may be provided on the distributor member or as separate members. And so with the pad members 95 as to their number and the structure on which they are provided. It is to be noted, however, that the greater the number of such pad members, the greater the heat conducting capacity between the distributor member and the heating cylinder structure. In the illustrated examples the relative dimensions and volumetric capacities between the various material flow passages is believed to be desirable for the specific heating cylinder of the example, but such relationships may be varied to meet the conditions of the various heating cylinder designs and contractions incorporating the invention, although it is my belief that the general ratio between the foregoing factors as exemplified in the illustrated embodiment is a desirable one for obtaining the new and efficient results from my invention.

The invention and the various features thereof are expressed in the example hereof as embodied in a plasticizing or heating cylinder as a component of an injection molding machine but the invention is not limited or restricted to such use as it contemplates and includes expressions and embodiments thereof as the plasticizing components for plastic extrusion machines, as well as for various other adaptations where the heating or plasticizing of plastic and the like materials may be required.

It will also be evident that various other changes, modifications, eliminations, substitutions and additions may be resorted to without departing from the broad spirit and scope of my invention, and hence I do not intend or desire to limit my invention to the exact and specific example thereof herein disclosed except as may be required by intended limitations thereto appearing in any of the claims hereto appended.

What I claim is:

1. In a heating cylinder assembly, in combination, a heating cylinder formed of heat conducting material having an intake opening at one end thereof, an injection discharge opening at the opposite end thereof, and a main passage extending from said intake opening to and opening for discharge at its inner end at a location adjacent but spaced inwardly from said injection discharge opening; rib members within said main passage extending longitudinally therealong and radially thereinto and being spaced apart therearound; said rib members having depths radially of said main passage to locate their inner longitudinal edge portions spaced apart and defining therebetween a central passage; said heating cylinder having separate channels spaced radially outwardly from, extending longitudinally along and spaced apart around said main passage and a plurality of ducts spaced apart along each of said channels between such channel and said main passage; the inner ends of said rib members being inclined inwardly toward said central passage to provide a conical discharge opening from said main passage; said heating cylinder being also formed to provide a chamber therewithin between said injection discharge opening and said conical discharge opening at the inner end of said main passage; a distributor member mounted in said chamber spaced from surrounding adjacent portions of said heating cylinder forming an annular passage of relatively small radial depths around said distributor member; said distributor member having a conical portion extending from one side thereof into said conical discharge opening of said main passage forming an annular conical passage therearound of relatively small radial depths from said main passage to said chamber; and said distributor member also forming an annular passage therearound between and in communication with said injection discharge opening and said conical passage at the discharge end of said main passage.

2. In a heating cylinder assembly, in combination, a heating cylinder formed of heat conducting material having an intake opening at one end and an injection discharge opening at the opposite end of smaller diameter than said intake opening; said heating cylinder being formed to provide therewithin a main passage extending from said intake opening to and discharging at a location spaced inwardly from said injection discharge opening; rib members extending longitudinally along and radially into said main passage spaced apart therearound; said rib members having their longitudinal edge portions spaced apart and defining therebetween a central columnar passage; said heating cylinder providing channels therein separated from, extending longitudinally along and spaced apart around said main passage; said heating cylinder having a plurality of feeder ducts therein spaced apart along each of said channels for feeding material thereinto from said main passage; the inner ends of said rib members at the discharge end of said main passage being inclined inwardly toward said central columnar passage to form a conical discharge opening from said main passage; said heating cylinder having a chamber therewithin between said injection discharge opening and said conical discharge opening from said main passage; a distributor member mounted in said chamber spaced from surrounding adjacent portions of said heating cylinder; said distributor member being provided with a conical portion extending from one side thereof into said conical discharge opening of said main passage to form an annular conical passage therearound of relatively small radial depth for flow of material therethrough from said main passage; said distributor member having an annular passage therearound of relatively small radial depths from said conical chamber at said conical discharge opening of said main passage to said injection discharge opening; and said channels extending to and opening into said annular passage around said distributor member.

3. A heating cylinder assembly having an intake opening at one end and a discharge opening at the opposite end thereof, including, in combination, a shell formed of heat conducting material having an axial chamber therethrough open at one end to said intake opening and open at the opposite end to said discharge opening of said heating cylinder assembly; said heating cylinder assembly having a counterbore opening therethrough coaxial with said chamber of said shell at the discharge end thereof; a closure member of heat conducting material provided with an axial injection discharge passage therethrough mounted in said counterbore; a sleeve member of heat conducting material tightly fitted into and extending inwardly a distance from the intake end of said heating cylinder assembly through said axial chamber of said shell; said sleeve member having a circular section passage therethrough of constant internal diameters open at its outer end at said intake opening of said shell and open at its inner end providing a discharge opening therefrom; said inner discharge end of said sleeve member being spaced a distance inwardly of said shell from said closure member; said shell, the inner open end of said sleeve member and the inner end of said end closure member providing an intermediate chamber therewithin and therebetween having a maximum internal diameter at least as great as the internal diameter of said circular section passage through said sleeve member; a distributor member of heat conducting material mounted in said intermediate chamber extending between and spaced at its opposite ends from the inner open end of said sleeve member and the inner end, respectively, of said closure member of said shell in position spaced from and around the adjacent surrounding portions of said shell, said discharge end of said sleeve member and said inner end of said closure member providing flow controlling passages of relatively small radial depths around said distributor member connecting the open discharge end of said passage through said sleeve member with said injection discharge passage through said closure member; and means mounting and positioning said distributor member in said intermediate chamber of said shell.

4. A heating cylinder assembly including, in combination, a shell formed of heat conducting material provided with an axial chamber therethrough having an intake opening through one end of said shell and a discharge opening through the opposite end thereof; a closure member mounted in said discharge opening of said shell and having an axial injection discharge therethrough open at its inner end to said axial chamber of said shell; a sleeve member of heat conducting material tightly fitted into and extending a distance through said chamber of said shell in heat transfer relation therewith with the inner end of said sleeve located adjacent but spaced a distance inwardly from said end closure member; said sleeve member having an axial passage therethrough of constant maximum internal diameters open at one end at said intake opening of said shell and open at its opposite inner end within said axial chamber of said shell; said sleeve member having a plurality of rib members disposed longitudinally in, spaced apart around and extending radially into said passage of said sleeve member throughout substantially the length thereof; said rib members having their inner longitudinal edges spaced apart to form therebetween a central passage of constant diameter open to and along the spaces between said rib members and the inner ends of said spaces between said rib members open and discharging into said chamber of said shell at the inner end of said sleeve member; said shell, the inner end of said sleeve member and the inner side of said end closing member providing an intermediate distribution chamber therewithin and therebetween having a maximum internal diameter at least equal to the internal diameter of said axial chamber through said shell; a distributor member of heat conducting material mounted in said intermediate chamber in position spaced from and around the adjacent portions of said shell, said inner discharge end of said sleeve member and said inner end of said end closure member providing annular flow controlling passages around said distributor member of relatively small radial widths connecting the open discharge ends of both said central passage through said sleeve member and said spaces between said rib members with said injection discharge passage through said closure member; and means mounting and positioning said distributor member in said intermediate chamber.

5. In a heating cylinder assembly, in combination, a heating cylinder formed of heat conducting material having an inlet opening at one end and an injection discharge opening at the opposite end thereof; said heating cylinder having therewithin a main passage extending thereinto from said intake opening to a location with its inner end open within said cylinder for discharge therefrom at a location spaced a distance inwardly from said injection discharge opening; said heating cylinder having therein a plurality of separate channels spaced radially outwardly from, spaced apart around and extending longitudinally along said main passage throughout substantially the length thereof; said heating cylinder having therein a plurality of openings spaced apart around and spaced apart along said main passage throughout substantially the lengths of said channels opening from said main passage to said channels for extraction of fluent material from along and around said main passage; said channels being open at the inner ends thereof for discharge of fluent material therefrom; and said heating cylinder also having therein annular, concentric and communicating flow passages of relatively small radial depths concentric with said main passage and connecting the inner discharge ends of said main passage and said channels with said injection discharge opening of said heating cylinder.

6. In a heating cylinder assembly, in combination, a heating cylinder formed of heat conducting material having an intake opening at one end, an injection discharge opening at the opposite end thereof, and a main passage of constant maximum internal diameters extending a distance therethrough from said intake opening with its inner end open for discharge therefrom at a location therein spaced inwardly from said injection discharge opening; said heating cylinder having therewithin separate channels spaced radially outwardly from and extending longitudinally along said main passage throughout substantially the length of the latter; said heating cylinder also having spaced feeder ducts along each of said channels throughout substantially the length thereof from said main passage to said channels for extracting fluent material from along and around said main passage to said channels; said heating cylinder having therewithin a chamber between the inner open end of said main passage and said injection discharge opening of said heating cylinder of greater maximum internal diameter than the maximum internal diameter of said main passage; said channels having the inner ends thereof open to said chamber for discharge of fluent material thereinto; a distributor member mounted in and substantially occupying said chamber but spaced from and around adjacent surrounding portions of said heating cylinder forming an annular passage therealong and therearound of relatively small radial depths in communication at its inner end with said main passage and inner discharge ends of said channels and in communication at its outer end with said injection discharge opening from said heating cylinder for flow of fluent material from said main passage and said channels to said injection discharge opening; and means mounting and positioning said distributor member in said chamber of said heating cylinder.

7. In a heating cylinder assembly, in combination, a heating cylinder formed of heat conducting material having an intake opening at one end thereof, an injection discharge opening at the opposite end thereof, and a main passage extending from said intake opening to and discharging at its inner end at a location spaced a distance inwardly from said injection discharge opening; rib members within said main passage extending longitudinally therealong radially thereinto and spaced apart therearound forming passages therebetween open at the inner ends thereof; said rib members having depths radially of said main passage to locate their inner longitudinal edge portions spaced apart around said main passage defining therebetween and therealong a central passage open throughout its length to said passages between said rib members; said heating cylinder having separate channels therein spaced radially outwardly from, extending longitudinally along and spaced apart around said main passage; said heating cylinder also having therein a plurality of ducts spaced apart along each of said channels between such channel and said main passage for extracting fluent material from the latter to said channels; said heating cylinder having therewithin a chamber between said injection discharge opening and said discharge opening at the inner end of said main passage; said channels being open at their inner ends for discharge therefrom into said chamber; a distributor member mounted in said chamber in position spaced from surrounding adjacent portions of said heating cylinder forming an annular passage of relatively small radial depths along and around said distributor member between and connecting said discharge openings at the inner ends of said central passage and said passages between said rib members and said inner ends of said channels with said injection discharge opening of said heating cylinder; and means mounting and positioning said distributor member in said chamber.

8. In a heating cylinder assembly, in combination, a heating cylinder formed of heat conducting material having an intake opening at one end, an injection discharge opening at the opposite end thereof, and a bore therethrough extending from said intake opening to said injection discharge opening; a sleeve member of heat conducting material tightly fitted into and extending through said bore in heat transfer relation with said heating cylinder with the inner end of said sleeve member located spaced a distance inwardly from said injection discharge end of said heating cylinder; said sleeve member having an axial passage therethrough open at one end at said intake opening of said heating cylinder and open at its opposite, inner end within said bore spaced a distance inwardly from said injection discharge opening of said heating cylinder; said heating cylinder and said sleeve member having therebetween, spaced apart therearound and disposed longitudinally therealong throughout substantially the length of said sleeve member a plurality of channels; said sleeve member having spaced feeder ducts therein spaced apart along said channels throughout substantially the length thereof from said axial passage through said sleeve member to said channels; said heating cylinder having a chamber therewithin between the inner discharge end of said sleeve member and said injection discharge opening; the inner ends of said channels being open and discharging into said chamber; a distributor mounted in and substantially occupying said chamber between the inner discharge end of said axial passage through said sleeve member and said injection discharge opening of said heating cylinder; said distributor being spaced from adjacent surrounding portions of said heating cylinder and said sleeve member forming annular flow passages of relatively small radial depths therearound between the inner discharge ends of said channels and said axial passage of said sleeve member and said injection discharge opening of said heating cylinder; and means mounting and positioning said distributor in said chamber.

9. In a heating cylinder assembly, in combination, a heating cylinder formed of heat conducting material having an intake opening at one end thereof, an injection discharge opening at the opposite end thereof, and a main passage of constant maximum internal diameters extending therethrough from said intake opening to and open at its inner end at a location spaced inwardly from said injection discharge opening; said heating cylinder having therewithin separate channels spaced radially outwardly from, spaced apart around and extending longitudinally along said main passage throughout substantially the length thereof; said channels having the inner ends thereof open for discharge therefrom; said heating cylinder having therein feeder ducts spaced apart along each of said channels from said main passage for extracting fluent material from said main passage to said channels; said heating cylinder having a chamber therewithin between said open inner end of said main passage and said injection discharge opening; said chamber having a maximum internal diameter greater than the maximum internal diameter of said main passage with said main passage and said inner discharge ends of said channels opening thereinto; a distributing member mounted in and substantially occupying said chamber to form annular passages therearound of relatively small radial depths extending between said inner discharge ends of said channels and said main passage and said injection discharge opening; and means mounting and positioning said distributor member in said chamber.

10. In a heating cylinder assembly, in combination, a heating cylinder formed of heat conducting material having an intake opening at one end, an injection discharge opening at the opposite end thereof, and a main passage therethrough extending from said intake opening with its inner end open and located spaced a distance inwardly from said injection discharge opening; rib members within said main passage extending radially thereinto, spaced apart therearound and disposed longitudinally thereof throughout substantially the length of said main passage; said rib members forming therebetween a central passage; the inner ends of said ribs being inclined inwardly toward said central passage forming a conical discharge opening therefrom at the inner end thereof; said heating cylinder having a plurality of separate channels disposed longitudinally along, spaced radially outwardly from and spaced apart around said main passage throughout substantially the length thereof; said heating cylinder having a plurality of feeder ducts therein between said main passage and said separate channels spaced apart along said channels for extracting fluent material from along and around said main passage; said heating cylinder having a system of annular axially aligned, communicating flow passages of relatively small radial depths extending and constituting the sole communication between said separate channels and said main passage and said injection discharge opening; and said system of flow passages comprising an intermediate annular passage having an internal diameter at least as great as the internal diameter of said main passage, an annular conical passage formed in and around and coaxial with said conical discharge opening from said main passage in communication with both said main passage and said channels and tapering radially outwardly and forwardly therefrom to said intermediate annular passage, and an annular conical passage between said intermediate annular passage and said injection discharge opening in said heating cylinder tapering forwardly and radially inwardly from and around said intermediate passage to said injection discharge opening.

References Cited in the file of this patent
UNITED STATES PATENTS

| | | |
|---|---|---|
| Re. 22,899 | Tucker | July 15, 1947 |
| 2,192,263 | Johnson | Mar. 5, 1940 |
| 2,573,440 | Henning | Oct. 30, 1951 |

FOREIGN PATENTS

| | | |
|---|---|---|
| 911,542 | Germany | Apr. 8, 1954 |
| 698,632 | Great Britain | Oct. 21, 1953 |